(12) United States Patent
Corbett et al.

(10) Patent No.: US 8,465,240 B2
(45) Date of Patent: Jun. 18, 2013

(54) ADVANCED NUT AND BOLT

(75) Inventors: Robert J. Corbett, Woodway, TX (US); James L. Wollard, Jr., Waco, TX (US)

(73) Assignee: Alcoa Inc., Pittsburgh, PA (US)

(*) Notice: Subject to any disclaimer, the term of this patent is extended or adjusted under 35 U.S.C. 154(b) by 368 days.

(21) Appl. No.: 12/647,033

(22) Filed: Dec. 24, 2009

(65) Prior Publication Data
US 2010/0172717 A1 Jul. 8, 2010

Related U.S. Application Data

(60) Provisional application No. 61/142,828, filed on Jan. 6, 2009, provisional application No. 61/185,373, filed on Jun. 9, 2009.

(51) Int. Cl.
*F16B 33/00* (2006.01)
(52) U.S. Cl.
USPC .............. 411/366.1; 411/366.3; 411/383; 411/432; 411/436; 411/924.1
(58) Field of Classification Search
USPC .............. 411/366.1, 366.3, 383, 411, 424, 411/432, 436, 924.1, 937, 937.2, 938, 259, 411/295, 929
See application file for complete search history.

(56) References Cited

U.S. PATENT DOCUMENTS

| | | | | |
|---|---|---|---|---|
| 1,697,118 A * | 1/1929 | Hoke | ............................ | 411/277 |
| 1,884,973 A * | 10/1932 | Hoke | ............................ | 411/311 |
| 1,953,095 A * | 4/1934 | Baker | ............................ | 403/307 |
| 2,564,029 A * | 8/1951 | Peterson | ..................... | 411/366.1 |
| 2,567,483 A * | 9/1951 | Hotine | ............................ | 74/441 |
| 2,684,606 A * | 7/1954 | Brawley | ......................... | 81/441 |
| 3,018,684 A * | 1/1962 | Brancato | .................... | 411/366.3 |
| 3,258,284 A * | 6/1966 | Phipps | .......................... | 403/343 |
| 3,394,626 A * | 7/1968 | Oliver | ........................... | 411/411 |
| 4,171,012 A * | 10/1979 | Holmes | ......................... | 411/285 |

(Continued)

FOREIGN PATENT DOCUMENTS

DE    92 19 017 U1    3/1992
EP    1933044 A2    6/2008

(Continued)

OTHER PUBLICATIONS

The C50L® HuckBolt® Fastening System, Alcoa Fastening Systems, 2005 (8 pages).

(Continued)

*Primary Examiner* — Roberta Delisle
(74) *Attorney, Agent, or Firm* — Greenberg Traurig, LLP (57) ABSTRACT

A vibration resistant fastening system including a high fatigue strength bolt made from a first material and a nut made from a second material that is softer than the first material of the bolt. The bolt includes bolt threads and the nut includes pre-tapped nut threads that match with the bolt threads. The fastening system utilizes a combination of unique geometry of the nut and bolt threads and a hardness differential between the nut and bolt to provide vibration resistance. When tightened, crests of the bolt threads embed into the soft bearing flanks of the nut threads. Simultaneously with the bolt crest embedment, the softer nut thread crests flow radially inward into the root radius of the bolt threads. This complete contact between the nut and the bolt restricts the nut from moving in a transverse direction relative to a longitudinal axis of the bolt.

21 Claims, 13 Drawing Sheets

U.S. PATENT DOCUMENTS

| | | | | |
|---|---|---|---|---|
| 4,225,981 A | * | 10/1980 | Zeibig | 623/22.43 |
| 4,846,614 A | * | 7/1989 | Steinbock | 411/307 |
| 4,936,727 A | * | 6/1990 | Kolvereid | 411/237 |
| 5,413,445 A | * | 5/1995 | Cartellone | 411/400 |
| 5,738,472 A | * | 4/1998 | Roopnarine et al. | 411/309 |
| 5,865,581 A | * | 2/1999 | Sadri et al. | 411/5 |
| 5,908,276 A | | 6/1999 | Kerr | |
| 7,293,339 B2 | | 11/2007 | Mercer et al. | |
| 2005/0244249 A1 | * | 11/2005 | Sussenbach | 411/411 |
| 2006/0222475 A1 | * | 10/2006 | Breihan et al. | 411/411 |
| 2006/0263171 A1 | * | 11/2006 | Schwarz | 411/411 |

FOREIGN PATENT DOCUMENTS

| | | |
|---|---|---|
| GB | 855215 | 11/1960 |
| JP | 4029607 A | 1/1992 |
| JP | 8177837 A | 7/1996 |
| JP | 11315820 A | 11/1999 |
| JP | 2003074533 A | 3/2003 |
| JP | 2003183735 A | 7/2003 |
| JP | 2005511319 A | 4/2005 |
| JP | 2007511720 A | 5/2007 |
| JP | 2008142121 A | 6/2008 |
| RU | 2 249 628 C1 | 4/2005 |
| RU | 2 249 629 C1 | 4/2005 |
| WO | 2006100766 A1 | 9/2006 |
| WO | 2007021638 A2 | 2/2007 |
| WO | 2007109751 A2 | 9/2007 |

OTHER PUBLICATIONS

Spiralock Company Profile—Spiralock—More secure threads, http://www.fastening-solutions.co.uk/profiles/16/index.html, (2 pages), Mar. 2, 2009.

Military Specification Sheet, Pin-Rivet, Grooved, Brazier Head, et al., MIL-P-23469/2B(SH), Feb. 19, 1988 (7 pages).

ASTM International, Designation A490-10, Standard Specification for Structural Bolts, Alloy Steel, Heat Treated, 150 ksi Minimum Tensile Strength (6 pages), May 1, 2010.

ASTM International, Designation A325-10, Standard Specification for Structural Bolts, Steel, Heat Treated, 120/105 ksi Minimum Tensile Strength (8 pages), May 1, 2010.

SAE International, SAE J429, Mechanical and Material Requirements for Externally Threaded Fasteners, 1999 (16 pages).

ASME B18.2.1-1996, Square and Hex Bolts and Screws (Inch Series) (86 pages).

ASME B1.3-2007, Screw Thread Gaging Systems for Acceptability: Inch and Metric Screw Threads, Oct. 12, 2007 (21 pages).

ASME B1.1-2003, Unified Inch Screw Threads, Sep. 30, 2004 (9 pages).

International Search Report and Written Opinion issued in connection with Applicants' related International Patent Application No. PCT/US2009/069523 entitled "Advanced Nut and Bolt" (9 pages).

Office Action issued in connection with European Patent Application No. 09 801 637.1 (4 pages), Feb. 18, 2011.

* cited by examiner

ADVANCED NUT AND BOLT

CROSS-REFERENCE TO RELATED APPLICATIONS

This application is a Section 111(a) application relating to commonly owned, U.S. Provisional Application Ser. No. 61/142,828 entitled "ADVANCED NUT AND BOLT" filed Jan. 6, 2009, and to commonly owned, U.S. Provisional Patent Application Ser. No. 61/185,373 entitled "ADVANCED NUT AND BOLT" filed Jun. 9, 2009, both of which are incorporated by reference herein.

FIELD OF THE INVENTION

The present invention relates to a fastening system, and, more particularly, to a vibration-resistant fastening system that includes a nut and a high fatigue strength bolt.

BACKGROUND OF THE INVENTION

Conventional nuts and bolts are convenient to use, but both are subject to loosening under severe vibrational loading. Moreover, the bolts' threads can create stress risers and do not have the necessary fatigue strength to hold up against high spike loads. What is needed is a nut and bolt fastening system that resists vibrational loosening, has superior fatigue strength to hold up against high spike loads, and can be quickly installed and removed with conventional installation tools.

SUMMARY OF THE INVENTION

A fastening system that includes a high fatigue strength bolt made from a first material and a nut made from a second material that is softer than the first material of the bolt. In an embodiment, the fastening system includes an approximate ratio of 4:3 or higher of bolt to nut hardness. The bolt includes external bolt threads and the nut includes pre-tapped, internal nut threads that match and threadedly mate with the external bolt threads. In an embodiment, the fastening system utilizes a combination of unique geometry of the nut and bolt threads and the hardness differential between the nut and bolt to create a vibration resistant system. In one embodiment, the fastening system provides for the convenience of a nut and bolt, but has the fatigue strength and vibration resistance of advanced lock bolts. When rotationally tightened with conventional torque tools, the flanks of the nut thread conforms with the opposing flanks of the bolt. After the nut and bolt flanks are completely mated, the crests of the bolt threads embed into the softer, corresponding bearing flanks of the nut threads. Simultaneously with the aforesaid bolt crest embedment, the softer nut thread crests flow radially inward and into corresponding root radii of the bolt threads. This complete contact between the nut and the bolt restricts the nut from moving in a transverse direction relative to the longitudinal axis of the bolt. As a result, the fastening system has good vibration resistance. During the tightening process, the present fastening system generates clamp much like a standard nut and bolt. The present fastening system differs, however, in that it simultaneously uses part of the clamp energy to create a unique vibration resistant feature.

The present invention can be used in a variety of applications and environments, such as, for example, military equipment, farm equipment, automotive and trucking applications, and rail applications. Further features and advantages of the invention will appear more clearly on a reading of the detailed description of the embodiments of the invention, which is given below by way of example only with reference to the accompanying drawings.

BRIEF DESCRIPTION OF THE DRAWINGS

For a better understanding of the present invention, reference is made to the following detailed description of the embodiments considered in conjunction with the accompanying drawings, in which.

DETAILED DESCRIPTION OF THE EMBODIMENTS

Figure 1:
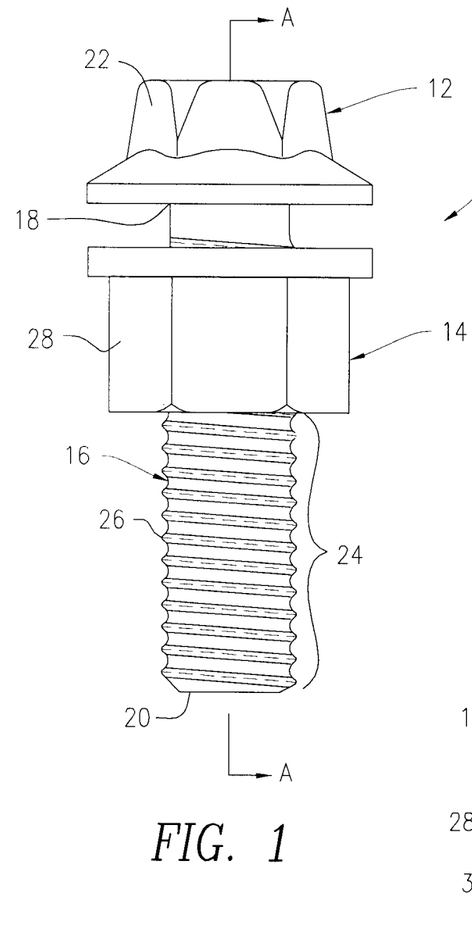
FIG. 1 is a side elevational view of a fastening system in accordance with an embodiment of the present invention.
Figure 2:
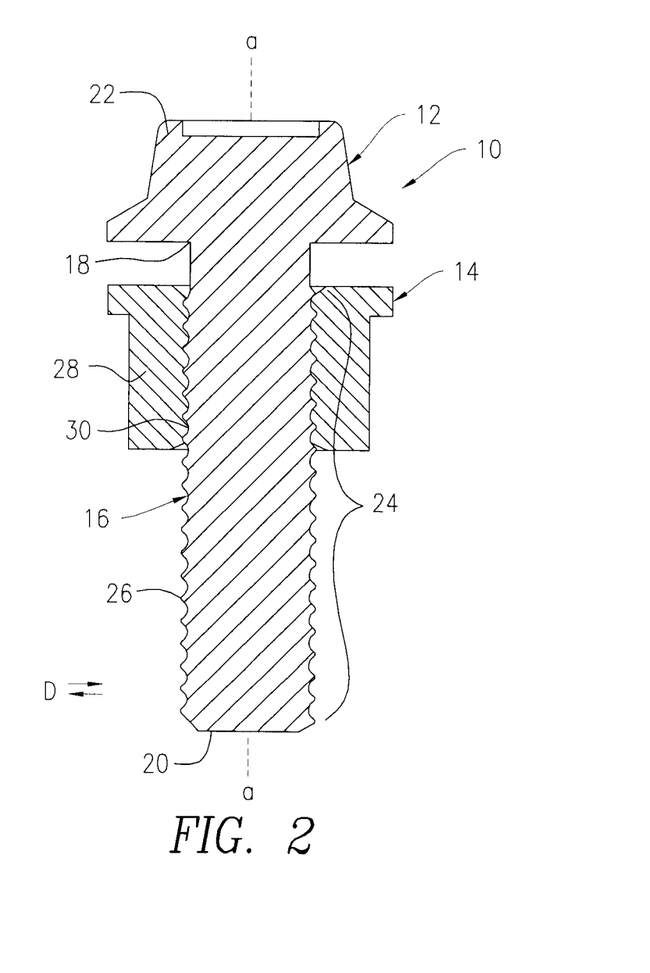
FIG. 2 is a cross-sectional view, taken along lines A-A and looking in the direction of the arrows, of the fastening system shown in FIG. 1.

Referring to FIGS. 1 and 2, a fastening system 10 includes a bolt 12 and a nut 14 that threadedly mates with the bolt 12 for fastening two work pieces, joints, or the like to one another (not shown in the Figures). In an embodiment, the bolt 12 is a high fatigue strength bolt made from a first material, while the nut 14 is made from a second material that is softer than that the first material of the bolt 12. The materials used to make the bolt 12 and the nut 14 are described in more detail hereinafter.

Still referring to FIGS. 1 and 2, in an embodiment, the bolt 12 includes an elongated shank 16 having a first end 18 and a second end 20 opposite the first end 18, and an enlarged bolt head 22 positioned at the first end 18. In one or more embodiments, the bolt head 22 can consist of any type of bolt head size and shape known in the art (e.g., hex head, carriage bolt head, truss head, fillister head, etc.). The shank 16 includes a threaded portion 24 having external bolt threads 26. Embodiments of the bolt threads 26 will be described in further detail below. In one or more embodiments, the bolt threads 26 of the bolt 12 are similar to that of the BOBTAIL® fastening system manufactured by Alcoa Fastening Systems (a related company of the assignee hereof), which is disclosed in U.S. Pat. No. 7,293,339, the disclosure of which is incorporated by reference herein. An embodiment of the bolt disclosed in U.S. Pat. No. 7,293,339 includes a shallow thread and a large root radius (not shown in the present Figures). In another embodiment, a shallow thread and large root radius of the bolt threads 26 create a larger bolt cross-section and reduced stress concentration, thereby giving the bolt 12 improved fatigue and shear strength in the threaded portion 24.

Still referring to FIGS. 1 and 2, in an embodiment, the nut 14 includes an external hex 28 for facilitating the rotational tightening and loosening of the nut 14 on and from the bolt 12, respectively. In one or more embodiments, the nut 14 can include any type of appropriate nut known in the art, such as a hex nut, square nut, cap nut, wing nut, flange nut, etc. The nut 14 includes pre-tapped, internal nut threads 30 (see FIG. 2) that match with and threadedly engage the bolt threads 26 of the bolt 12. Embodiments of the nut threads 30 of the nut 14 will be described in further detail below.

In an embodiment, the bolt 12 and the nut 14 are made from materials that provide for an approximate ratio of 4:3 or higher of bolt to nut hardness. In an embodiment, the bolt 12 is a Grade 8 strength level bolt, and is made from medium carbon alloy steel, and the nut 14 is made from low carbon steel in as-headed or as-machined state. In another embodiment, the bolt 12 is made from medium carbon steel. In other embodiments, the nut 14 is made from low carbon alloy steel or from medium carbon steel. In an embodiment, the bolt 12 can be characterized by any grade known in the art, such as, for example, Grade 2, Grade 5, Grade 8, Class 8.8, and Class 10.9. In one embodiment, the fastening system 10 is able to achieve high clamp (Grade 8 or Class 10.9) while using low carbon (as-headed or as-machined) steel for the nut 14. In another embodiment, the as-headed and as-machined states generate cost savings when compared to a conventional nut. Typically, conventional nuts require costly secondary heat treatment processes to achieve hardness. The nut 14 of the fastening system 10 does not require secondary heat treatment processes.

In another embodiment, the fastening system 10 is made from titanium, aluminum or stainless steel or in a Grade 2 utility grade steel version or in a Grade 5 version, provided that an approximate ratio of 4:3 or higher of bolt to nut hardness is maintained. An approximate ratio of 4:3 or higher of bolt to nut hardness assures that the bolt threads 26 will not deform significantly when under load. If the bolt hardness is increased in the ratio, the bolt threads 26 will not deform significantly when under load. However, if the nut hardness is increased in the ratio or if the bolt hardness is decreased in the ratio, the bolt threads 26 may deform, thereby resulting in an unpredictable tensile loss.

In an embodiment, the hardness range for the nut 14 is Rb 75-95. In an embodiment, the hardness range for a Grade 8 and Class 10.9 bolt 12 is Rc 33-39. In an embodiment, the hardness range for a Grade 5 and Class 8.8 bolt 12 is Rc 24-34. In an embodiment, the hardness range for the nut 14 is Rb 53-75.

Figure 3:
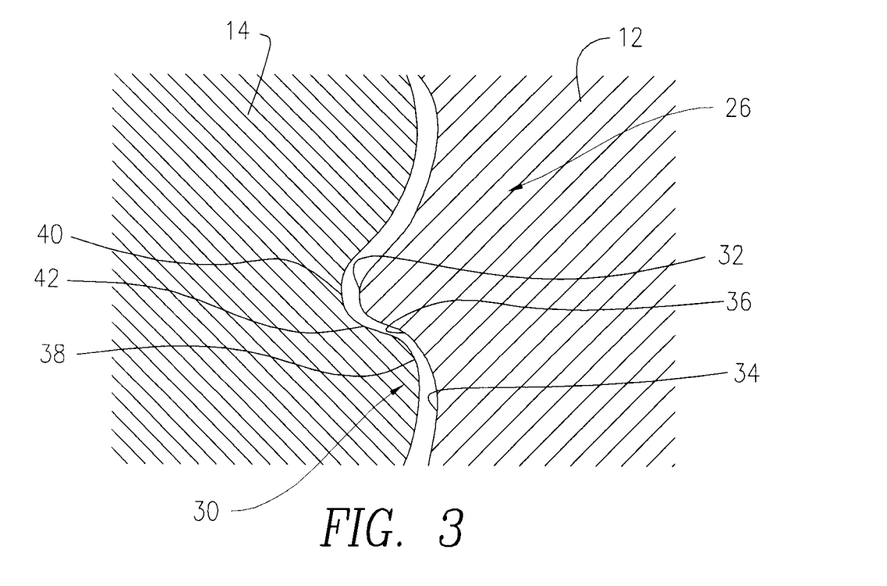
FIG. 3 is an enlarged cross-sectional view of nut threads of a nut and corresponding bolt threads of a bolt employed by the fastening system shown in FIG. 2, the nut and bolt being shown in a loosened position, the nut being shown on the left and the bolt being shown on the right.

Referring to FIG. 3, the nut threads 30 of the nut 14 (which are shown on the left in FIG. 3) and the bolt threads 26 of the bolt 12 (which are shown on the right in FIG. 3) are shown in a loosened position relative to one another. The bolt threads 26 are defined by a plurality of crests 32, a plurality of roots 34, and a plurality of flanks 36. Each of the flanks 36 joins a corresponding one of the plurality of crests 32 to a corresponding one of the plurality of roots 34. Similarly, the internal nut threads 30 are defined by a plurality of crests 38, a plurality of roots 40. Each of the plurality of flanks 42 joins a corresponding one of the plurality of crests 38 to a corresponding one of the plurality of roots 40.

Figure 4:
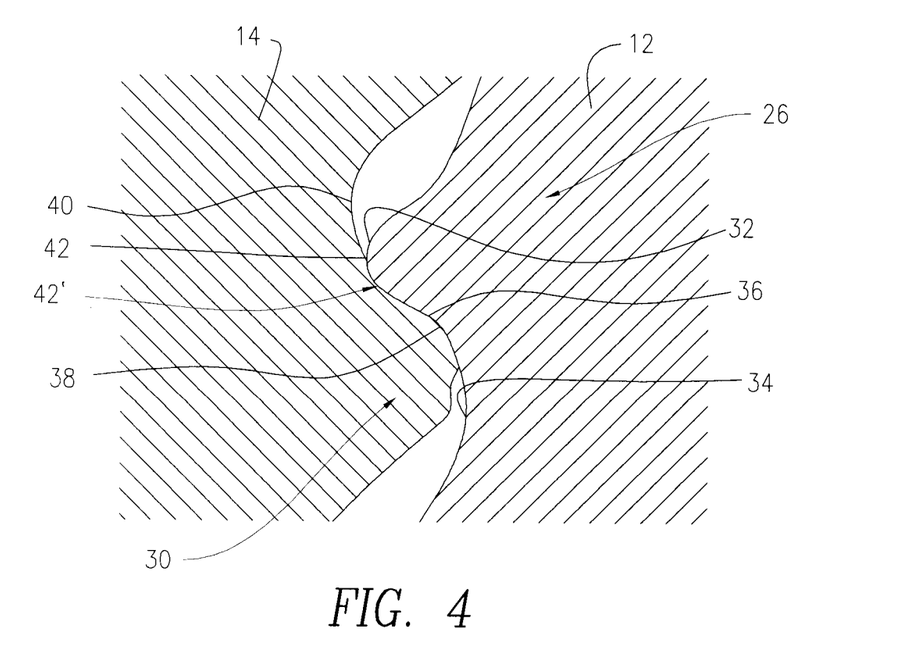
FIG. 4 is an enlarged cross-sectional view of the nut threads of the nut and bolt threads of the bolt shown in FIG. 3, but with the nut and bolt being shown in a tightened position.

Referring to FIG. 4, the nut threads 30 and the bolt threads 26 are shown in a tightened position relative to one another. When the bolt 12 and the nut 14 are mated with one another, one of the plurality of flanks 42 of the nut threads 30 conforms to a corresponding one of the plurality of flanks 36 of the bolt threads 26. After the flanks 36, 42 are completely mated, upon tightening of the nut 14 onto the bolt 12, one of a plurality of bearing flanks 42' of the nut thread 30 flows around a corresponding one of the crests 32 of the bolt threads 26. That is, the crests 32 of the bolt threads 26 embed into the soft bearing flanks 42' of the nut threads 30. Simultaneously with the embedment of the crests 32 of the bolt threads 26 into the bearing flanks 42 of the nut threads 30, each of the crests 38 of the nut threads 30 is forced and flows radially into a corresponding root 34 of the bolt threads 26, specifically the root radius of the root 34. Once tightened, the nut 14 cannot move in a transverse direction D relative to an axis a-a of the bolt 12 (see FIG. 2). As a result, consistent contact between the bolt thread 26 and the nut thread 30 is achieved for the full length of the nut 14.

Transverse vibration is a recognized cause of loosening in nuts and bolts. In the case of the fastening system 10, the nut 14 cannot move in the transverse direction D relative to the bolt 12. When tightened, the flanks 42 of the nut threads 30 conforms to the flanks 36 of the bolt threads 26 for the full length of the nut 14. In addition, contact surfaces are formed perpendicular to the transverse direction D at the crests 32 and the roots 34 of the bolt threads 26, thereby completely stopping transverse motion of the nut 14 relative to the bolt 12. As a result, vibration induced loosening is resisted. During the tightening process, the fastening system 10 generates clamp much like a standard nut and bolt, but the fastening system 10 differs in that it simultaneously uses part of the clamp energy to create its unique vibration resistant feature.

The fastening system 10 is considered "free running," which means that there is no torque required to spin the nut 14 down on the bolt 12 to the sheet line. This "free running" feature differs from many of the more conventional vibration resistant fastening system designs, often referred to as "prevailing torque" nuts. These "prevailing torque" nuts are both slower and more difficult to fit up.

Figures 5A, 5B, 5C:
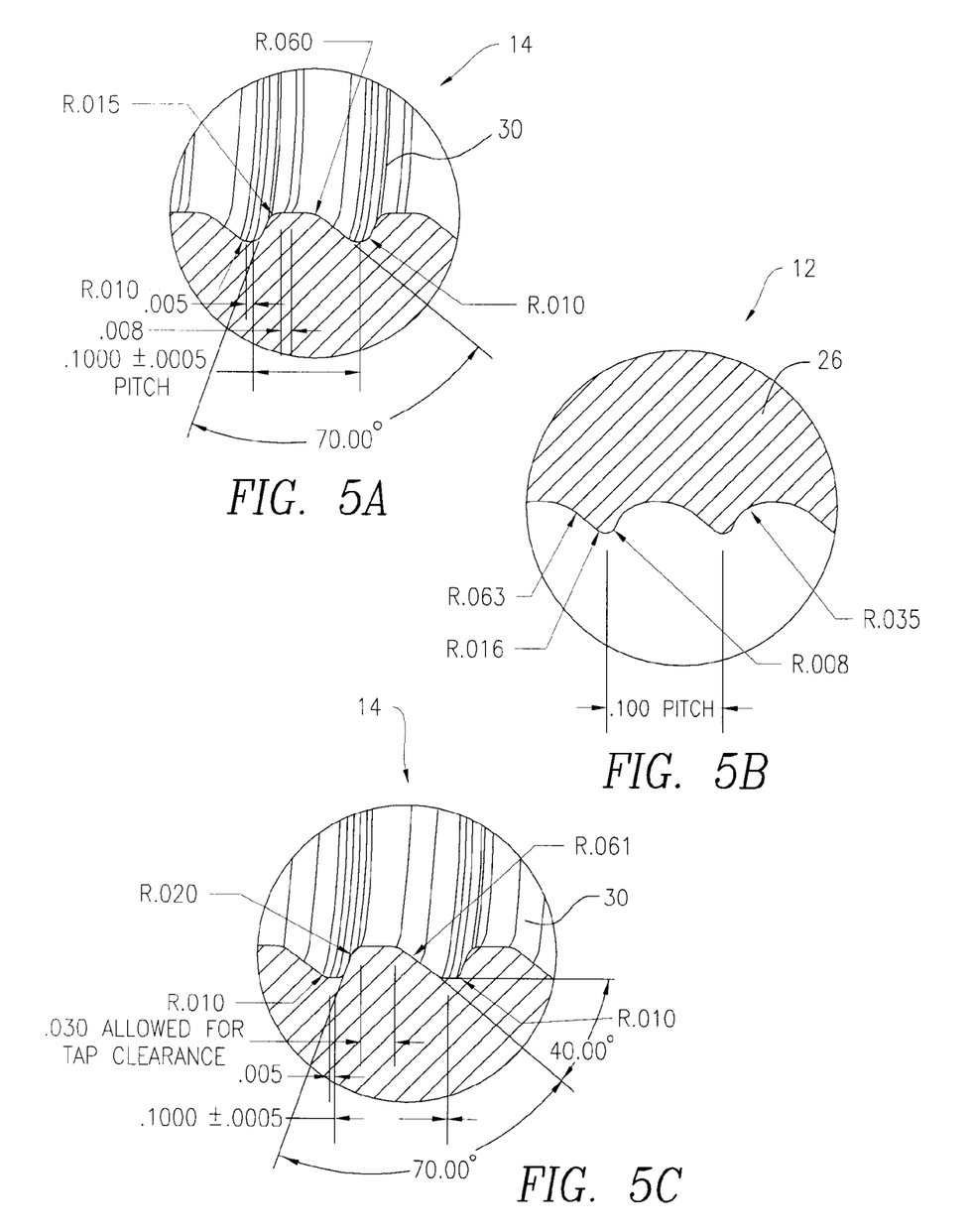
FIGS. 5A and 5B are enlarged sectional views of thread form details of an embodiment of the nut and bolt, respectively, employed by the fastening system shown in FIG. 1.
FIG. 5C is an enlarged sectional view of thread form details of another embodiment of the nut employed by the fastening system shown in FIG. 1.

An embodiment of the threadform details 30, 26 of the nut 14 and the bolt 12, respectively (which were used in initial testing of the fastening system 10 described below) is shown in FIGS. 5A and 5B, which is a ⅝" (16 mm) fastening system 10. In an embodiment, dimensions that are not shown in FIGS. 5A and 5B are as follows:

| | |
|---|---|
| Nut minor diameter: 0.581 ± .001" | Bolt minor diameter: 0.568" |
| Nut major diameter: 0.637 ± .001" | Bolt major diameter: 0.622 ± .002" |
| All radii are tangent and blended. | All radii are tangent and blended. |

The above dimensions correspond to an embodiment of the nut 14 created using a boring bar on a lathe. In another embodiment, the nut 14 is tapped using a high speed tapping machine and a tap. The tapping process requires a relief area at the minor diameter of the nut 14. FIG. 5C shows an embodiment of the tapped nut thread 30 detail.

Various vibration tests were preformed on samples of the aforedescribed ⅝" fastening system 10. In particular, samples of the fastening system 10 were tested in a Junker's transverse vibration machine, having 50 kip capacity, manufactured by SPS Unbrako. Several samples of the fastening system 10 were installed to a predetermined load and were transversely loaded with a plate that incurred a total deflection of 0.120" controlled with a cam operating at 12.5 Hz. The nut 14 of the fastening system 10 was installed on the oscillating plate. There was a 0.110" clearance on the inside of the oscillating plate to allow for bending and to produce the transverse loading. The following test procedure was performed for the vibration tests:

(1) The fastening system 10 was installed into the Junker's machine with the nut 14 visible at the top of the machine.

(2) The Junker's machine was energized and the test clamp load was monitored on a Nicolet oscilloscope.

(3) The test was discontinued after 5 minutes or fastener failure, whichever occurred first.

Figure 6:
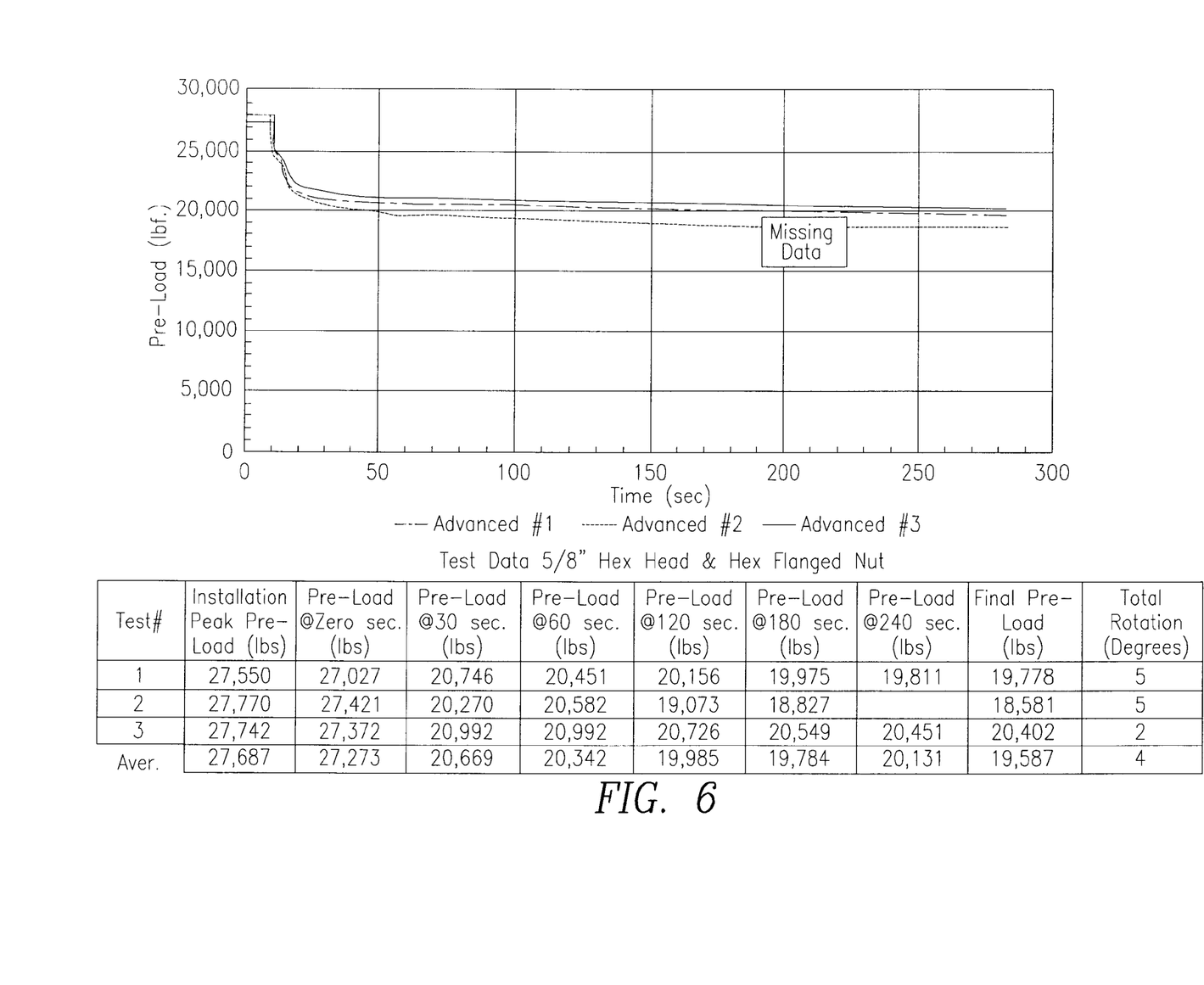
FIG. 6 illustrates vibrational test data results of samples of the fastening system shown in FIG. 1.

As a result, vibration test data for the fastening system 10 were received, which are shown in FIG. 6. Pre-load in lbf. was measured against Time in seconds. The samples are labeled as "Advanced #1" through "Advanced #3". The test results show that the samples of the fastening system 10 performed well in the Junker's vibration testing. At the beginning of the test, the fastening systems 10 take set, then settle in at approximately 20,000 lbf preload, and continue on indefinitely without further loosening. The hardness values of the nuts 14 used in the above-referenced testing were from (Rockwell) Rb 84 to 86. The bolts 12 were within Rc 35-38 hardness.

Figure 7:
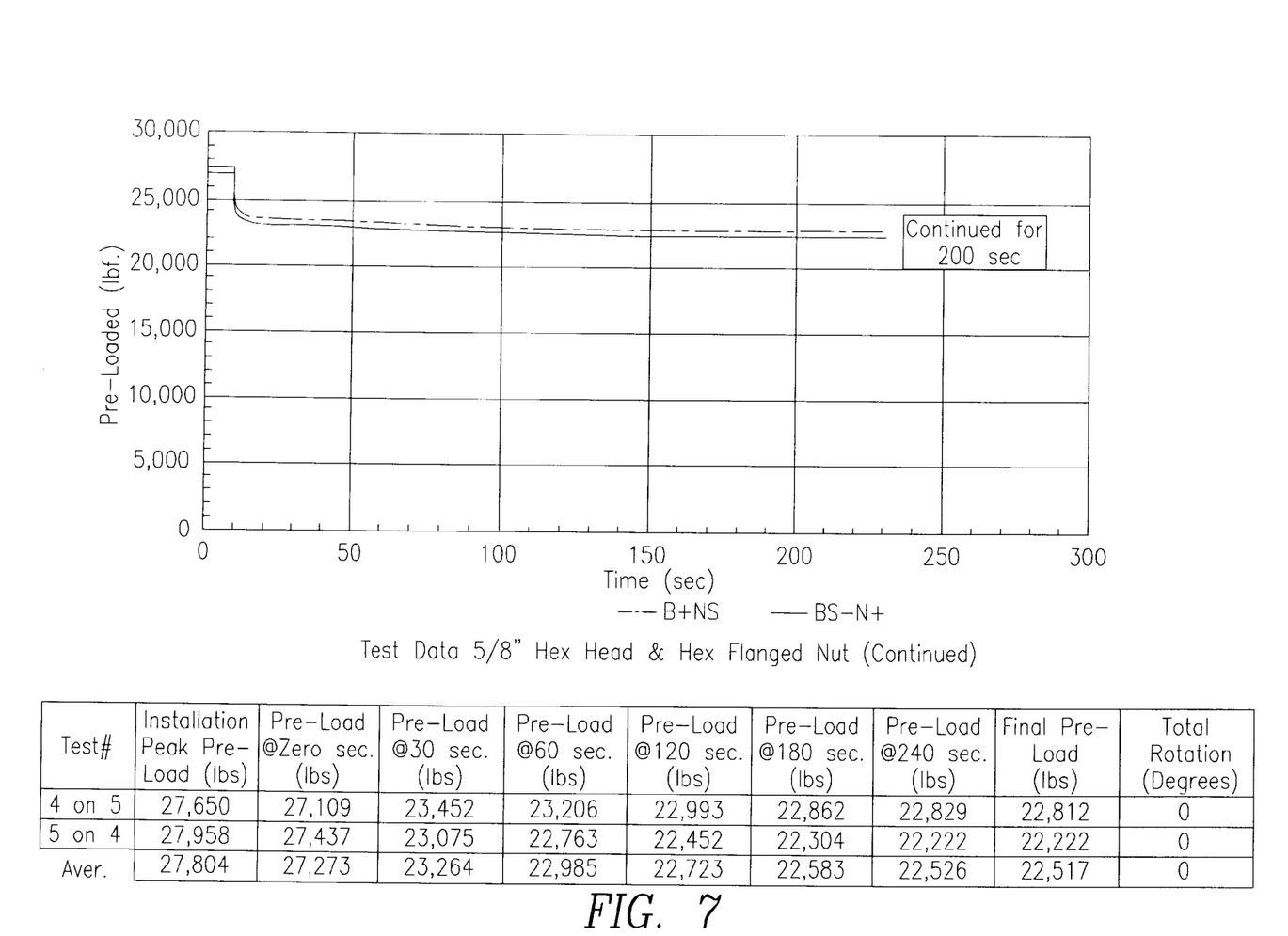
FIG. 7 illustrates reuse test data results for samples of the fastening system shown in FIG. 1.

FIG. 7 illustrates reuse test data for the fastening system 10. Pre-load in lbf. was measured against Time in seconds. The following test was performed by re-using the same nuts 14 and bolts 12 used from the initial vibration test described above in connection with FIG. 6. The nuts 14 and bolts 12 were then re-arranged so that each of the bolts 12 received a different nut 14 than in the initial test. At the beginning of the test, the fastening systems 10 take set, then settle in at approximately 22,500 lbf. preload, and continue on indefinitely without further loosening. This reuse test shows that the nuts 14 and bolts 12 can be randomly re-used without any major depreciation in the vibration resistance.

Figure 8:
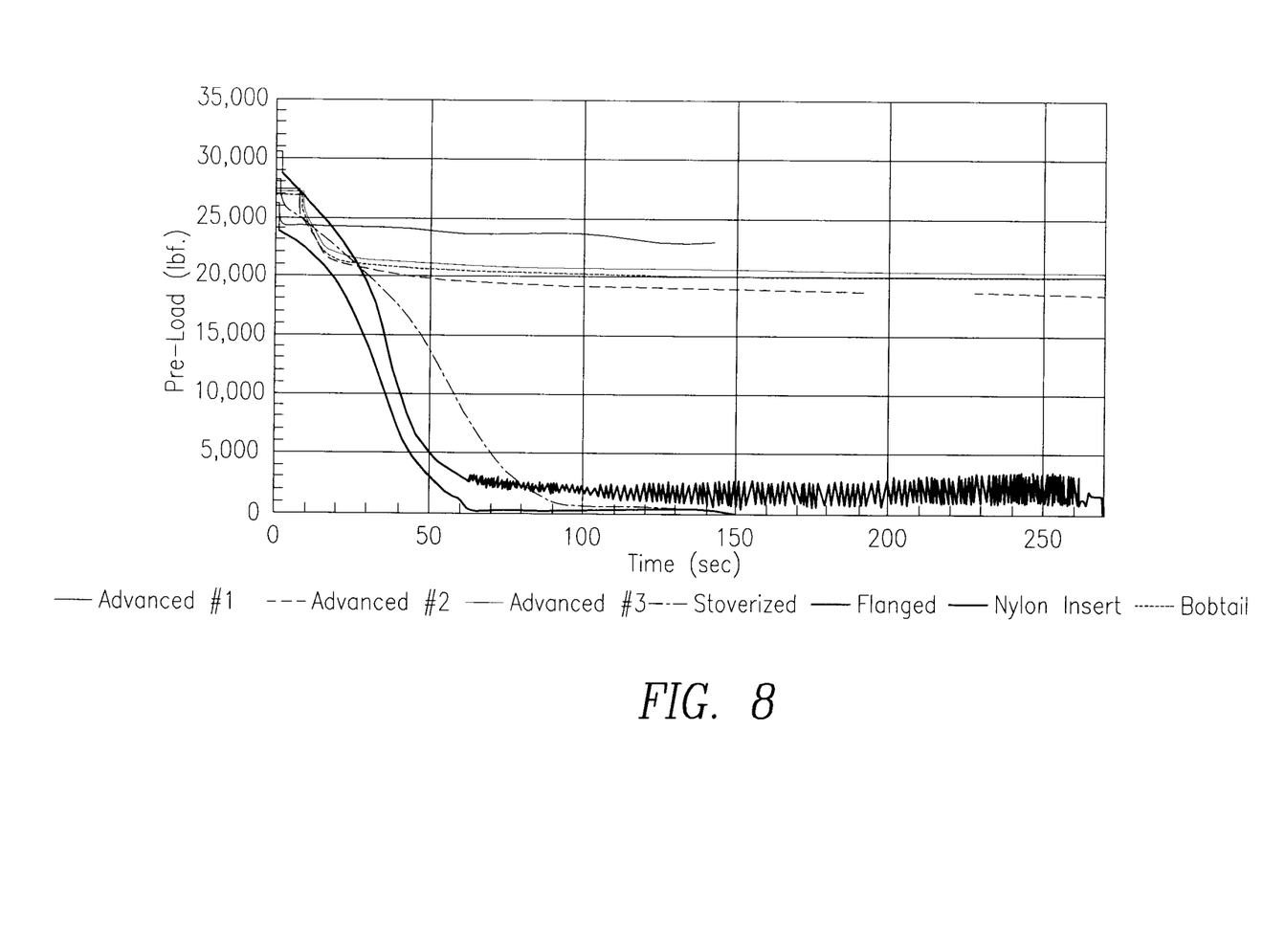
FIG. 8 illustrates comparative test data results for samples of the fastening system shown in FIG. 1 compared with prior art fastening systems.

FIG. 8 depicts comparative test data for samples of the fastening system 10. Pre-load in lbf. was measured against Time in seconds. Thus graph shows the initial test data for the fastening system 10 (labeled as "Advanced #1" through "Advanced #3") in comparison to other vibration resistant fastening systems (labeled as Stoverized" lock nut system," "Flanged" nut system and "Nylon Insert" system,"), as well as the BOBTAIL® system described above (labeled as "Bobtail"). Pre-load in lbf. was measured against Time in seconds. As shown by FIG. 8, the pre-loads for the samples of the fastening system 10 (as well as that for the BOBTAIL® system) dropped off slightly then remained steady at around 20,000 lbf. On the contrary, the pre-loads for the other systems suffered an immediate drop-off and flattened at or close to zero over a short period of time. Accordingly, this demonstrates that the fastening system 10 has good vibrational resistance.

Figure 9:
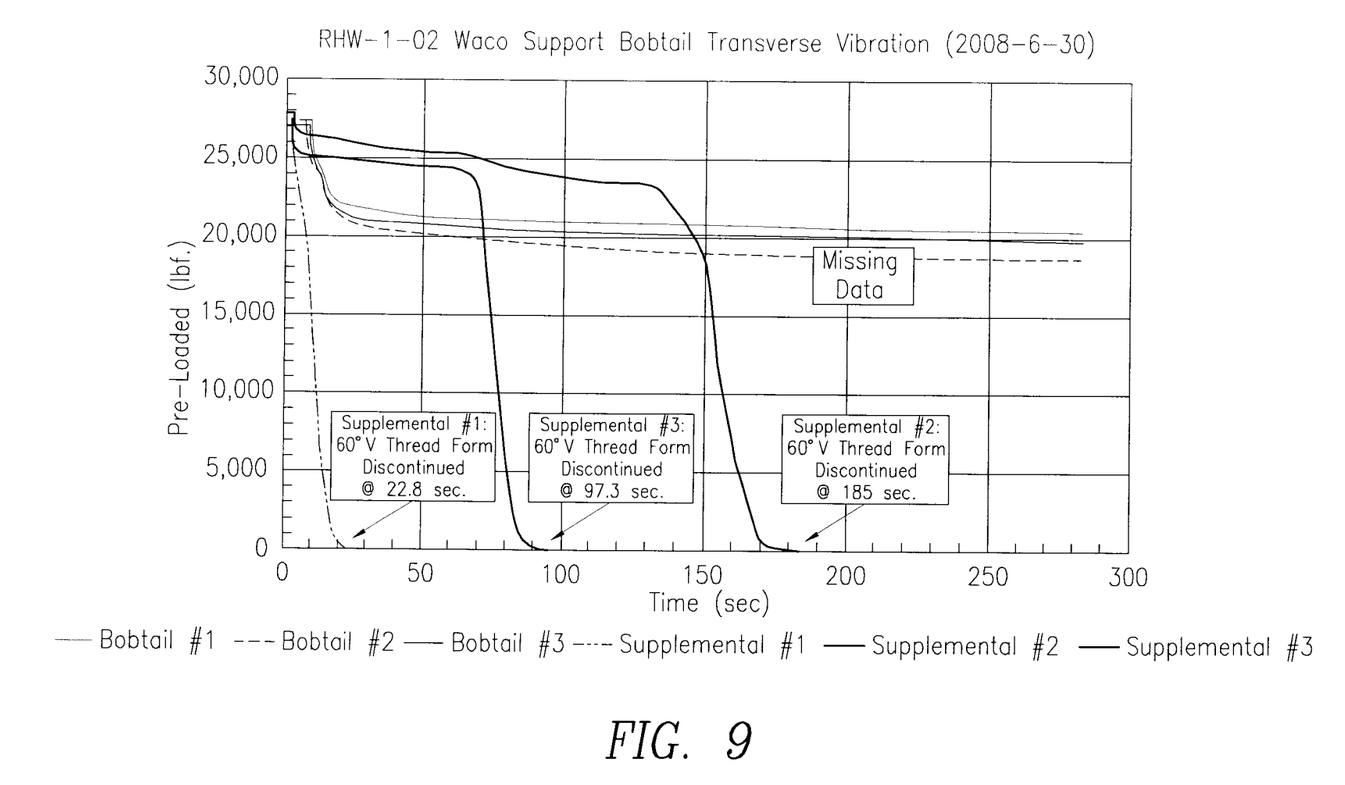
FIG. 9 illustrates further supporting test data results for samples of the fastening system shown in FIG. 1.

FIG. 9 shows further supporting test data for the fastening system 10. Pre-load in lbf. was measured against Time in seconds. The chart illustrates the effect of a differential in hardness between the bolt 12 and the nut 14, and the result in locking feature. In this test, a standard Grade 8 ⅝"-11 UNC bolt 12 was used in conjunction with a nut 14 (Rb 89-91) having a threaded I.D. tapped with a standard ⅝"-11 tap. This chart shows three tests of standard UNC tapped nuts 14 having the same hardness (Rb 89-91) as the fastening system 10 (labeled as "Supplemental") laid over three tests of the nuts 14 (labeled "Bobtail"). The chart shows that during vibration, the locking feature of the UNC nuts degrades with time, while the locking feature of the nuts 14 of the present fastening system 10 does not. Thus, this test data shows that vibration resistance of the locking feature of the fastening system 10 is not solely a result of the softening of the nut 14.

Figure 10:
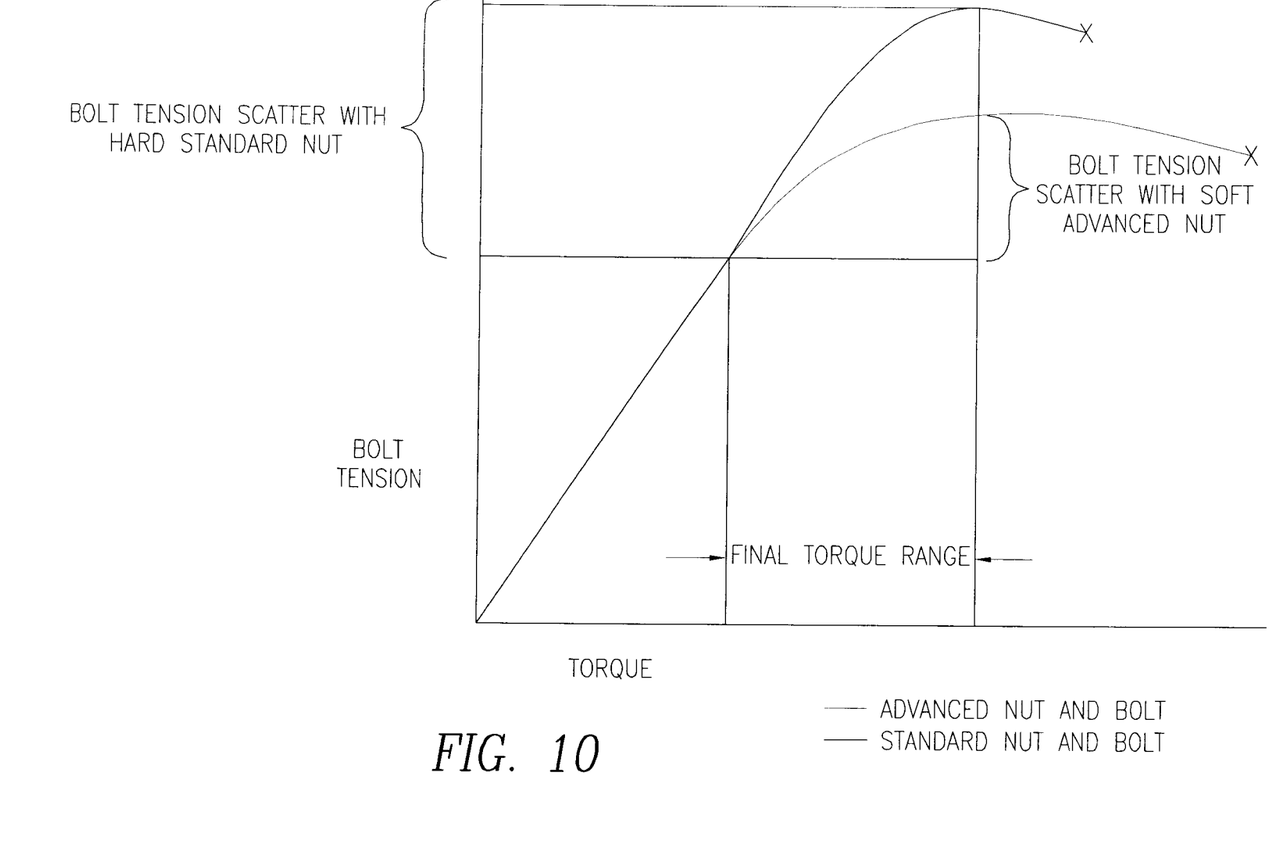
FIG. 10 depicts a clamp consistency chart for the fastening system shown in FIG. 1 as compared with a standard fastening system.

FIG. 10 depicts clamp consistency for the fastening system 10. There is an inherent clamp consistency built into the fastening system 10. Generally, a standard nut and bolt has a clamp variation of about 25-30% at a set torque. The clamp variation of the fastening system 10 may be as low as about 20%. This is due to the fact that the fastening system 10 operates in the deformation (yield) range of the nut 14 material. The softer material acts as a cushion and flattens out the installation curve. As the softer nut 14 is in the flat part of the yield curve, a large difference in torque causes a small difference in bolt tension. Conversely, a hard non-yielding nut has a very steep slope to the torque to tension curve. As such, a small difference in torque causes a large difference in bolt tension.

Figure 11A:
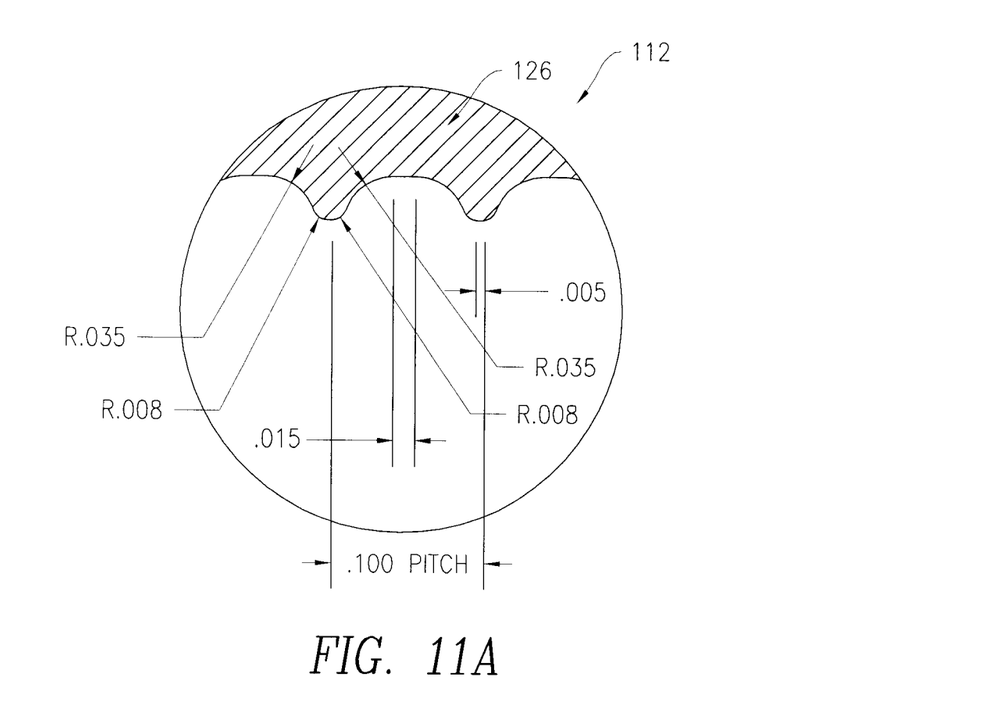
FIGS. 11A and 11B are enlarged views of thread form details of another embodiment of a bolt and nut, respectively, employed by the fastening system shown in FIG. 1.
Figure 11B:
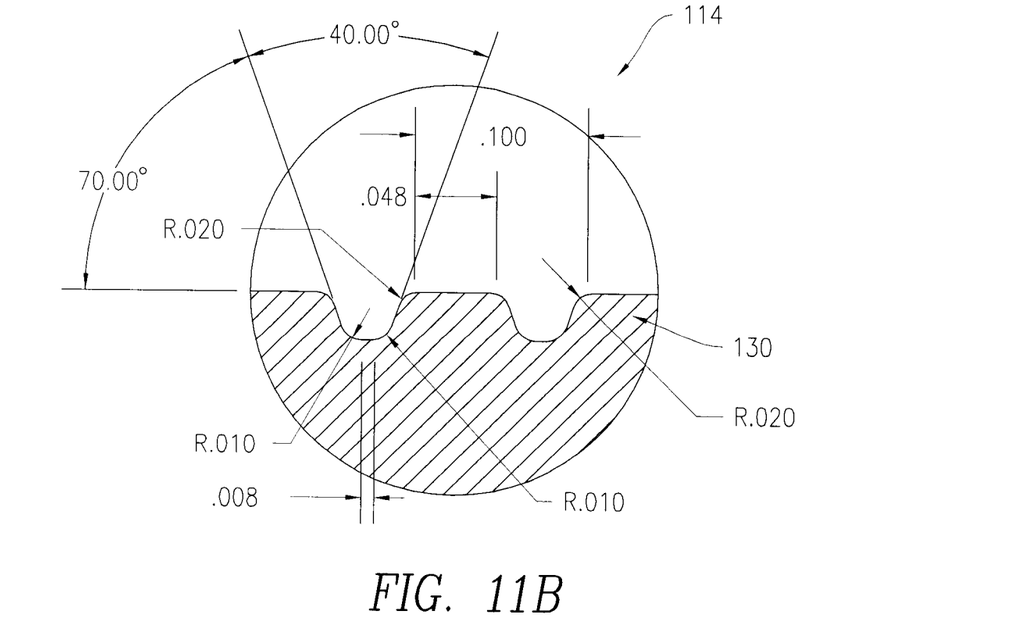

In another embodiment, the bolt and nut threads 26, 30 each include a unidirectional thread. This unidirectional thread requires that the nut 14 be oriented so that the bolt and nut threads 26, 30 match. In another embodiment, the bolt and nut threads 26, 30 are bi-directional. In an embodiment, the resulting geometry for a ⅝" (16 mm) diameter fastening system 110 (i.e., nut 114 and bolt 112) is shown in FIGS. 11A and 11B. Dimensions not included in FIGS. 11A and 11B are as follows:

| | |
|---|---|
| Bolt minor diameter: 0.568 ref. | Nut minor diameter: 0.581 ± .001" |
| Bolt major diameter: 0.622 ± .002" | Nut major diameter: 0.637 ± .001" |
| All radii are tangent and blended. | All radii are tangent and blended. |

Figure 12A:
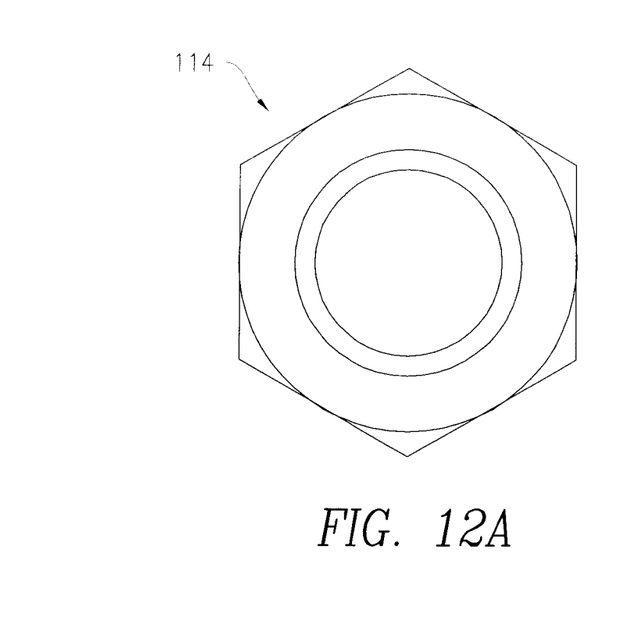
FIGS. 12A through 12C show another embodiment of a nut employed by the fastening system shown in FIG. 1.
Figure 12B:
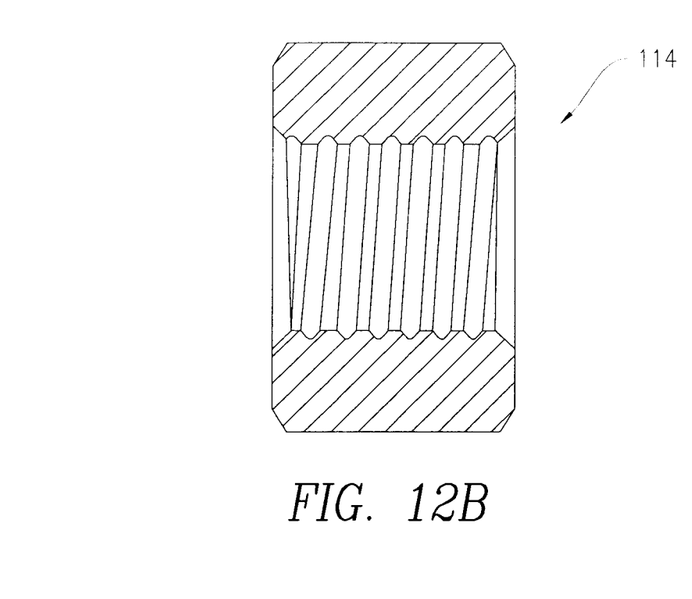
Figure 12C:
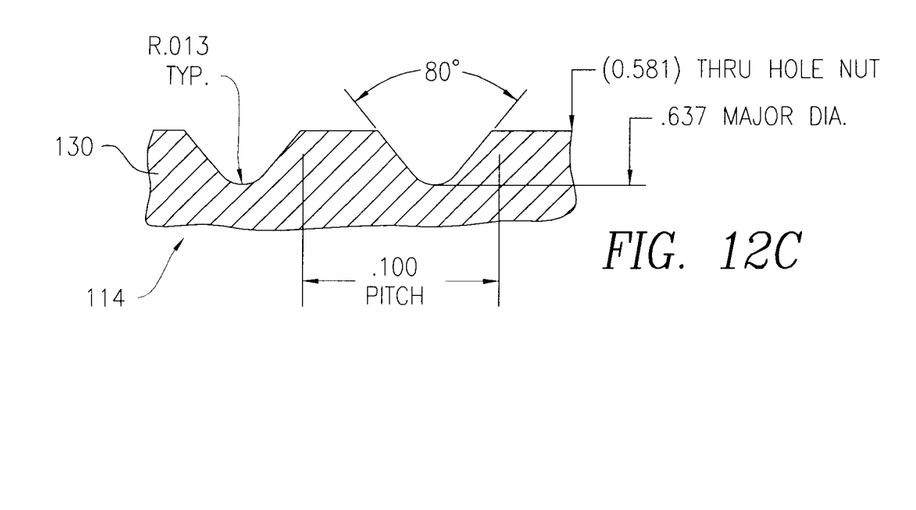
Figure 13A:
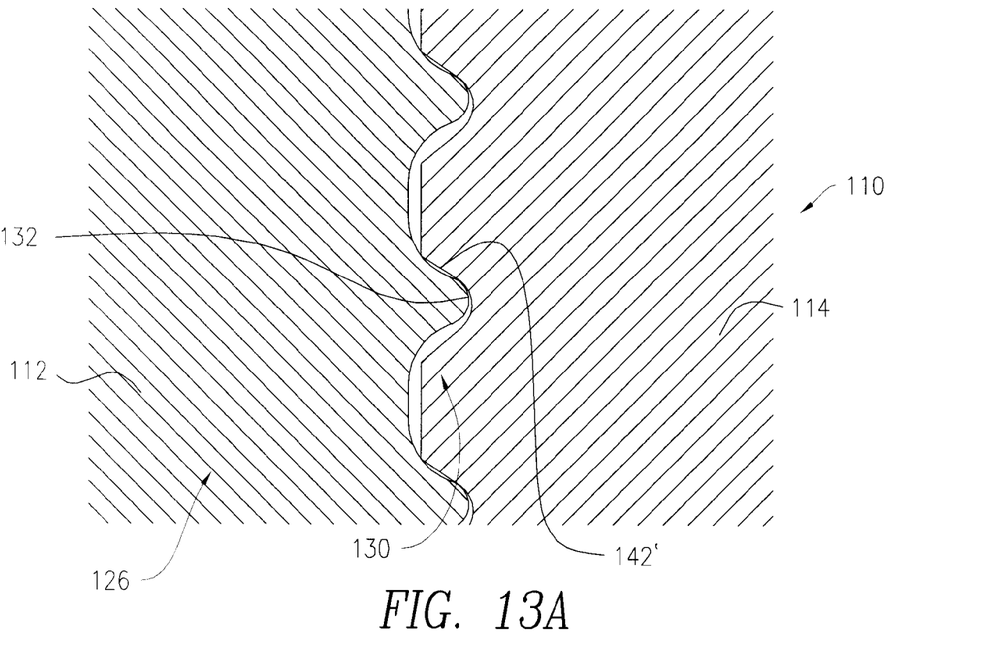
FIGS. 13A and 13B are enlarged cross-sectional views of nut threads of the nut shown in FIGS. 12A through 12C and bolt threads of the bolt shown in FIG. 11A, the nut and bolt being shown in a loosened position and a tightened position, respectively, the bolt being shown on the left and the nut being shown on the right in both FIGS. 13A and 13B.
Figure 13B:
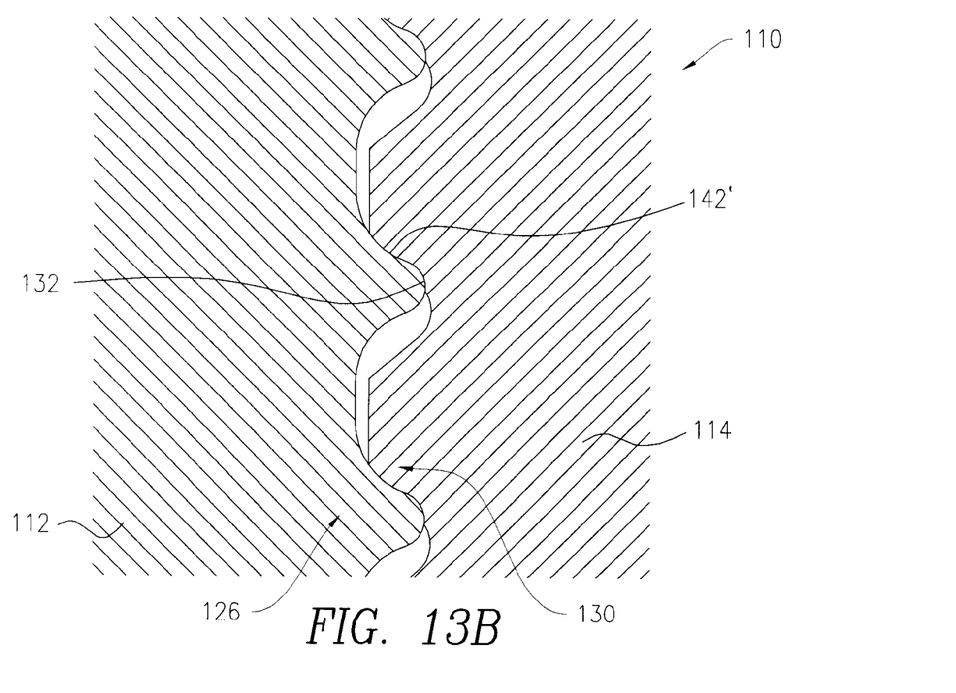

In another embodiment, a nut 114 is characterized as shown in FIGS. 12A through 12C. More particularly, the nut 114 contains an 80 degree included angle which runs out into the tap clearance flat. Thus, in connection with the fastening system 110 shown in FIGS. 13A and 13B, when the nut 114 and a corresponding bolt 112 (whose thread characteristics are shown in FIG. 11B) are mated with one another, crests 132 of bolt threads 126 hit corresponding bearing flanks 142' of nut threads 130 first, resulting in a point of the bolt 112 (which is made from a harder material) digging into the nut 114 (which is made from a softer material) at a lower load. This provides for vibration resistance at a lower torque/clamp load. This forming sequence (where the nut threads 130 initially form around the crests 132 of the bolt threads 126) creates the vibration resistance feature at a lower load. In an embodiment, vibration resistance is achieved, for instance, if a Grade 8 bolt is tightened to a Grade 5 clamp load.

Figure 14:
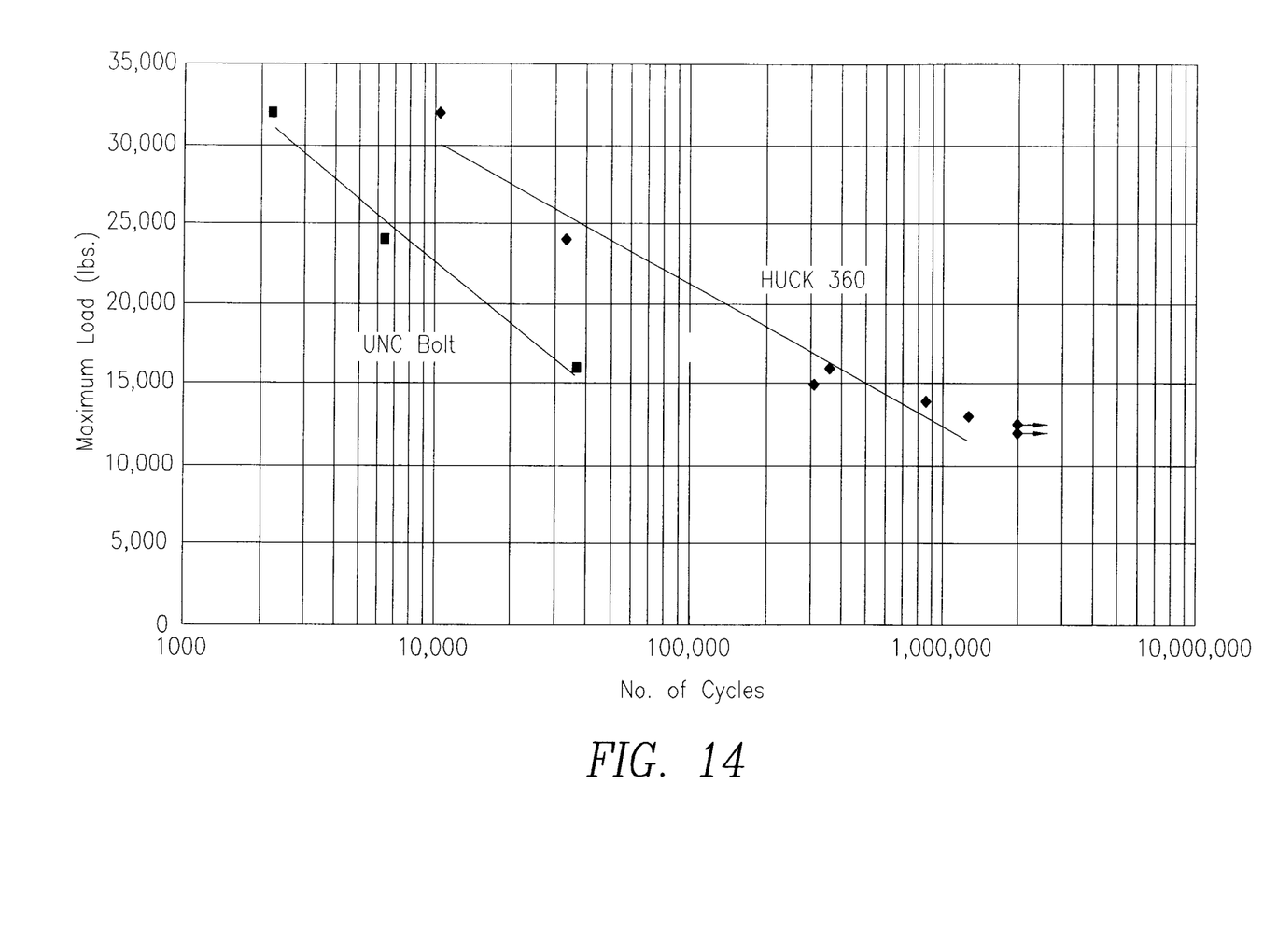
FIG. 14 illustrates fatigue test data results of samples of bolts having the thread form details shown in FIG. 11A as compared with a standard UNC bolt.

FIG. 14 illustrates average test results of a tension-tension fatigue test for the fastening system 110 as compared to a standard UNC fastening system. Maximum load in lbs. was measured against number of cycles. The sample system 110 used was a ⅝" diameter, Grade 8 system. As seen from FIG. 14, the fastening system 110 has five times the fatigue life of a comparable standard UNC system. Moreover, it has been measured that the maximum stress calculated for the fastening system 110 was 142 KSI, while the maximum stress calculated for a conventional UNC system was 194 KSI, resulting in the fastening system 110 having 27% less stress than the UNC system.

Figure 15:
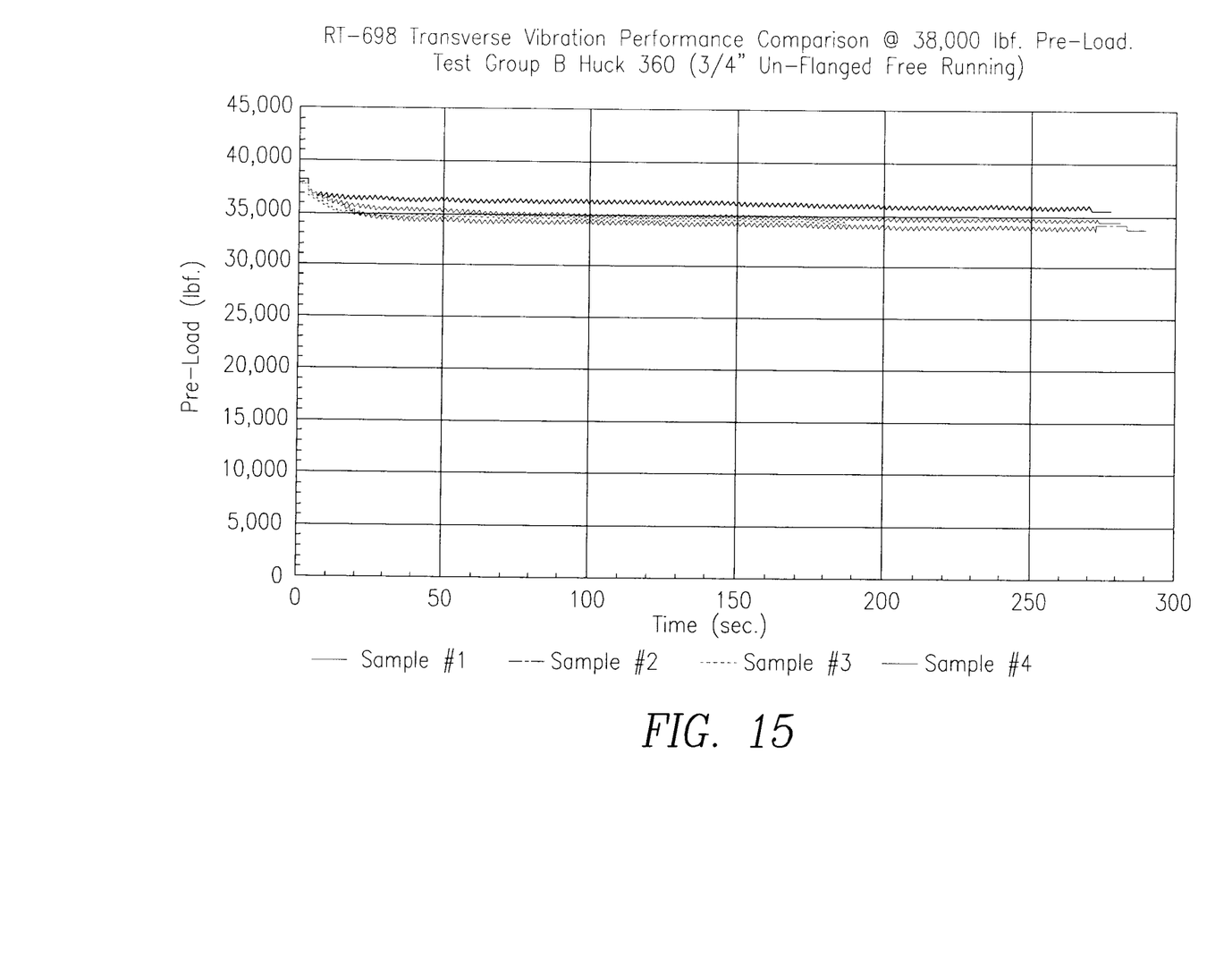
FIG. 15 illustrates transverse vibration test data of samples of the nut and bolt fastening system shown in FIGS. 13A and 13B.

FIG. 15 illustrates transverse vibrational test data of four samples of the fastening system 110. Pre-load in lbf. was measured against Time in seconds. Samples of a ¾" diameter fastening system 110 were used at 38,000 lbf. pre-load. As shown by FIG. 15, the pre-loads dropped off slightly then remained steady. Accordingly, this further demonstrates that the fastening system 110 has good vibrational resistance.

To summarize, the fastening systems 10, 110 have various beneficial features. For example, because the fastening systems 10, 110 are vibration resistant, they require less maintenance and equipment uptime is longer. The "free-running" thread provides for a fast fit-up and easy removability. This also prevents damage to any coatings of the systems 10, 110. Because the bolt threads 26, 126 are shallow and have low notch factors, they have high fatigue strength and absorb high spike loads. In an embodiment, the fastening systems 10, 110 can have Class 8.8 or Class 10.9 strength, and, therefore, provide for an easy upgrade from conventional nuts and bolts. Finally, the fastening systems 10, 110 have predictable torque/tension relationship. As a result, the fastened joints resist slip failure, and the components hold alignment and last longer.

It should be understood that the embodiments described herein are merely exemplary and that a person skilled in the art may make many variations and modifications without departing from the spirit and scope of the invention. For example, in an embodiment, the bolts 12, 112 can include any type of threaded pin, such as a carriage bolt, a hex bolt, U-bolts, J-bolts, machine screws, etc. In an embodiment, the nuts 14, 114 can include any type of nut, such as a hex nut, square nut, cap nut, wing nut, flange nut, etc. In an embodiment, any type of appropriate washers can be used with the fastening systems 10, 110 such as flat, square, locking, dock, fender, etc. (not shown in the Figures). In an embodiment, the fastening systems 10, 110 can include appropriate coatings, such as zinc plating, galvanizing, chrome, etc. Accordingly, all such variations and modifications are intended to be included within the scope of the embodiments described herein as defined in the appended claims.

What is claimed is:

1. A fastening system for securing a plurality of work pieces together, comprising:
a bolt having an elongated shank adapted to be positioned within aligned openings in the work pieces, the shank terminating at one end in an enlarged head and including a threaded portion having a plurality of external bolt threads, the bolt threads of the bolt including a plurality of crests and a plurality of roots, each of the plurality of roots including a root radius, each of the plurality of crests being joined to a corresponding one of the plurality of roots by a first bearing flank and to a corresponding another of the plurality of roots by a second bearing flank opposite the first bearing flank, each of the first and second bearing flanks including a first tangential radius and a second tangential radius, wherein the first tangential radius extends from the corresponding one of the plurality of roots of the bolt threads to the second tangential radius, and the second tangential radius extends from the first tangential radius to the one of the plurality of crests, each of the plurality of crests including a flat surface extending between the second tangential radius of the first bearing flank and the second tangential radius of the second bearing flank, the bolt being made from a first material;

and a nut having a plurality of internal nut threads, the nut threads defined by a plurality of crests and a plurality of roots, one of the plurality of crests of the nut threads being joined to a corresponding one of the plurality of roots of the nut threads by a bearing flank, -the nut threads being sized and shaped to threadedly engage the bolt threads, the nut being made from a second material that is softer than the first material of the bolt, whereby when the nut threads engage the bolt threads of the bolt, each of the second tangential radii of each of the first bearing flanks and each of the flat surfaces of the plurality of crests of the bolt threads is adapted to embed into a corresponding one of the plurality of bearing flanks of the nut threads and each of the plurality of crests of the nut threads is adapted to deform and flow into the root radius of a corresponding one of the plurality of roots of the bolt threads to create complete contact between the engaged nut threads and bolt threads so as to restrict the nut from moving in a direction transverse to a longitudinal axis of the bolt.

2. The fastening system of claim 1, wherein the first material of the bolt and the second material of the nut are each steel.

3. The fastening system of claim 2, wherein the first material of the bolt is medium carbon alloy steel.

4. The fastening system of claim 3, wherein the second material of the nut is low carbon steel.

5. The fastening system of claim 3, wherein the second material of the nut is low carbon alloy steel.

6. The fastening system of claim 3, wherein the second material of the nut is medium carbon steel.

7. The fastening system of claim 3, wherein the second material of the nut is medium carbon alloy steel.

8. The fastening system of claim 2, wherein the first material of the bolt is medium carbon steel.

9. The fastening system as claimed in claim 2, wherein a ratio of a hardness of the bolt to a hardness of the nut is at least 4:3.

10. The fastening system of claim 9, wherein the nut includes a hardness in the range of approximately Rb 75 to approximately Rb 95.

11. The fastening system of claim 9, wherein the bolt is a Grade 8 bolt having a hardness in the range of approximately Rc 33 to approximately Rc 39.

12. The fastening system of claim 9, wherein the bolt is a Class 10.9 bolt having a hardness in the range of approximately Rc 33 to approximately Rc 39.

13. The fastening system of claim 9, wherein the bolt is a Grade 5 bolt having a hardness in the range of approximately Rc 24 to approximately Rc 34.

14. The fastening system of claim 9, wherein the bolt is a Class 8.8 bolt having a hardness in the range of approximately Rc 24 to approximately Re 34.

15. The fastening system of claim 9, wherein the nut includes a hardness in the range of approximately Rb 53 to approximately Rb 75.

16. The fastening system as claimed in claim 1, wherein the nut threads include a unidirectional thread and the bolt threads include a unidirectional thread.

17. The fastening system as claimed in claim 1, wherein the nut threads include a bidirectional thread and the bolt threads include a bidirectional thread.

18. The fastening system of claim 17, wherein nut threads include an included angle of approximately 80 degrees.

19. The fastening system of claim 17, wherein nut threads include an included angle of approximately 50 degrees.

20. The fastening system of claim 1, wherein the fastening system is a free running system.

21. A fastening system for securing a plurality of work pieces together, comprising:

a pin member having an elongated shank adapted to be positioned within aligned openings in the work pieces, the shank terminating at one end in an enlarged head and including a threaded portion having a plurality of external pin threads, the pin threads of the pin member including a plurality of crests and a plurality of roots, each of the plurality of roots including a root radius, each of the plurality of crests being joined to a corresponding one of the plurality of roots by a first bearing flank and to a corresponding another of the plurality of roots by a second bearing flank opposite the first bearing flank, each of the first and second bearing flanks including a first tangential radius and a second tangential radius, wherein the first tangential radius extends from the corresponding one of the plurality of roots of the pin threads to the second tangential radius, and the second tangential radius extends from the first tangential radius to the one of the plurality of crests, each of the plurality of crests including a flat surface extending between the second tangential radius of the first bearing flank and the second tangential radius of the second bearing flank the pin member being made from a first material; and a nut having a plurality of internal nut threads, the nut threads defined by a plurality of crests and a plurality of roots, one of the plurality of crests of the nut threads being joined to a corresponding one of the plurality of roots of the nut threads by a bearing flank, the nut threads being sized and shaped to threadedly engage the pin threads, the nut being made from a second material that is softer than the first material of the pin member, whereby when the nut threads engage the pin threads of the pin member, each of the second tangential radii of each of the first bearing flanks and each of the flat surfaces of the plurality of crests of the pin threads is adapted to embed into a corresponding one of the plurality of bearing flanks of the nut threads and each of the plurality of crests of the nut threads is adapted to deform and flow into the root radius of a corresponding one of the plurality of roots of the pin threads to create complete contact between the engaged nut threads and pin threads so as to restrict the nut from moving in a direction transverse to a longitudinal axis of the pin member.

* * * * *